(12) United States Patent
Litovtchenko et al.

(10) Patent No.: US 8,752,061 B2
(45) Date of Patent: Jun. 10, 2014

(54) RESOURCE ALLOCATION WITHIN MULTIPLE RESOURCE PROVIDERS BASED ON THE INCOMING RESOURCE REQUEST AND THE EXPECTED STATE TRANSITION OF THE RESOURCE REQUESTING APPLICATION, AND SELECTING A RESOURCE PROVIDER BASED ON THE SUM OF THE PERCENTAGE OF THE RESOURCE PROVIDER CURRENTLY USED, THE REQUESTING LOAD AS A PERCENTAGE OF THE RESOURCE PROVIDER'S TOTAL RESOURCE, AND THE ADDITIONAL LOAD IMPOSED BY THE EXPECTED STATE OF THE REQUESTING APPLICATION AS A PERCENTAGE OF THE RESOURCE PROVIDER'S TOTAL RESOURCE

(75) Inventors: Vladimir Litovtchenko, Ebersberg (DE); Florian Bogenberger, Poing (DE)

(73) Assignee: Freescale Seimconductor, Inc., Austin, TX (US)

( * ) Notice: Subject to any disclaimer, the term of this patent is extended or adjusted under 35 U.S.C. 154(b) by 169 days.

(21) Appl. No.: 13/128,025

(22) PCT Filed: Nov. 24, 2008

(86) PCT No.: PCT/IB2008/054917
§ 371 (c)(1),
(2), (4) Date: May 6, 2011

(87) PCT Pub. No.: WO2010/058246
PCT Pub. Date: May 27, 2010

(65) Prior Publication Data
US 2011/0214129 A1 Sep. 1, 2011

(51) Int. Cl.
*G06F 9/46* (2006.01)
*G06F 15/173* (2006.01)

(52) U.S. Cl.
USPC ............ 718/104; 718/102; 718/105; 709/226

(58) Field of Classification Search
USPC .......................................................... 718/104
See application file for complete search history.

(56) References Cited

U.S. PATENT DOCUMENTS 7,813,993 B1 * 10/2010 Barto et al. ..................... 705/37
7,984,447 B1 * 7/2011 Markov ........................ 718/103

(Continued)

FOREIGN PATENT DOCUMENTS

| EP | 1483663 A1 * | 12/2004 |
| WO | 2005/078580 A | 8/2005 |
| WO | WO 2005078580 A1 * | 8/2005 |

OTHER PUBLICATIONS

Corbalan J et al: "Performance-Driven Processor Allocation" IEEE Transactions on Parallel and Distributed Systems, IEEE Service Center, Los Alamitos, CA, US, vol. 16, No. 7, Jul. 2005, pp. 599-611.

(Continued)

*Primary Examiner* — Lewis A Bullock, Jr.
*Assistant Examiner* — Kevin X Lu (57) ABSTRACT

A device receives a request for an amount of a resource. It determines for each resource provider in a set of resource providers a current load, a requested load corresponding to the requested amount of the resource, and an additional load corresponding to an expected state of an application. It determines for each of the resource providers an expected total load on the basis of the current load, the requested load, and the additional load. It subsequently selects from the set of resource providers a preferred resource provider on the basis of the expected total loads. The resource may be one of the following: memory, processing time, data throughput, power, and usage of a device.

20 Claims, 5 Drawing Sheets

(56) References Cited

U.S. PATENT DOCUMENTS

| | | | | |
|---|---|---|---|---|
| 8,046,761 | B2* | 10/2011 | Howson | 718/102 |
| 8,122,453 | B2* | 2/2012 | Trossman et al. | 718/104 |
| 8,261,282 | B1* | 9/2012 | Ponnapur et al. | 718/105 |
| 2005/0149940 | A1 | 7/2005 | Calinescu et al. | |
| 2005/0223382 | A1 | 10/2005 | Lippett | |
| 2007/0058662 | A1* | 3/2007 | Yoshikawa | 370/447 |
| 2007/0101013 | A1* | 5/2007 | Howson | 709/231 |
| 2007/0143759 | A1 | 6/2007 | Ozgur et al. | |
| 2007/0220517 | A1 | 9/2007 | Lippett | |
| 2008/0222646 | A1* | 9/2008 | Sigal et al. | 718/105 |

OTHER PUBLICATIONS

Gerard Bosch I Creus et al: "System-Level Power Management for Mobile Devices" Computer and Information Technology, 2007, CIT 2007, 7th IEEE International Conference ON, IEEE, Piscataway, NJ, USA, Oct. 16, 2007, pp. 799-804.

International Search Report and Written Opinion correlating to PCT/IB2008/054917 dated Apr. 14, 2009.

* cited by examiner

| Name | Content | Example |
|---|---|---|
| Application Transitions and States Database  20 | Static configuration data. Includes all possible application states and transitions | IST1 -> T1 -> IST2, IST2 -> T3 -> IST2, IST2 -> T2 -> IST1 |
| Resource Load for process Resource Request Type Database  22 | Static configuration data. Holds function: Resource load(ResourceReq type) | Resource1 load for ResReq1 = 10%<br>Resource2 load for ResReq1 = 30%<br>Resource1 load for ResReq2 = 24%<br>Resource2 load for ResReq2 = 35%<br>Resource1 load for ResReq3 = 0.7%<br>Resource2 load for ResReq3 = 12% |
| Expected Resource Load for Application States Database  24 | Static configuration data. Holds function: Expected resource load(application state) | IST1: Resource1 = 55%, Resource2 = 75%<br>IST2: Resource1 = 30%, Resource2 = 45% |
| Current Resource State  16 | Dynamic data. Reflects current resource states/loads | Resource1 = 5%, Resource2 = 15% |
| Abstracted Application State  18 | Dynamic data. Reflects application state mapped by the mapping mechanism | IST1 |

$$\underbrace{\begin{Bmatrix} \textit{Estimated future} \\ \textit{load for received} \\ \textit{resource request} \\ \textit{(Prioritized} \\ \textit{Table of Possible} \\ \textit{Solutions)} \end{Bmatrix}}_{52} = \underbrace{\begin{Bmatrix} \textit{Resource Load for} \\ \textit{process Resource} \\ \textit{Request Type} \\ \textit{Database} \end{Bmatrix}}_{58} + \underbrace{\begin{Bmatrix} \textit{Expected} \\ \textit{Resource Load} \\ \textit{for Application} \\ \textit{States Database} \end{Bmatrix}}_{60} + \underbrace{\begin{Bmatrix} \textit{Current} \\ \textit{Resource} \\ \textit{State} \end{Bmatrix}}_{62}$$

Fig. 6

$$\underbrace{54 \rightarrow \begin{Bmatrix} \text{Resource1} = 45\% \\ 56 \rightarrow \text{Resource2} = 90\% \end{Bmatrix}}_{52} = \underbrace{\begin{Bmatrix} \text{Resource1 load for} \\ \text{ResReq1} = 10\% \\ \text{Resource2 load for} \\ \text{ResReq1} = 30\% \end{Bmatrix}}_{58} + \underbrace{\begin{Bmatrix} \text{Resource1} = 30\% \\ \text{Resource2} = 45\% \end{Bmatrix}}_{60} + \underbrace{\begin{Bmatrix} \text{Resource1} = 5\% \\ \text{Resource2} = 15\% \end{Bmatrix}}_{62}$$

RESOURCE ALLOCATION WITHIN MULTIPLE RESOURCE PROVIDERS BASED ON THE INCOMING RESOURCE REQUEST AND THE EXPECTED STATE TRANSITION OF THE RESOURCE REQUESTING APPLICATION, AND SELECTING A RESOURCE PROVIDER BASED ON THE SUM OF THE PERCENTAGE OF THE RESOURCE PROVIDER CURRENTLY USED, THE REQUESTING LOAD AS A PERCENTAGE OF THE RESOURCE PROVIDER'S TOTAL RESOURCE, AND THE ADDITIONAL LOAD IMPOSED BY THE EXPECTED STATE OF THE REQUESTING APPLICATION AS A PERCENTAGE OF THE RESOURCE PROVIDER'S TOTAL RESOURCE

FIELD OF THE INVENTION

This invention relates to a data carrier carrying instructions for management of multiple resources providers.

The invention further relates to a device comprising at least one processor, a data carrier, and a set of resource providers, the set of resource providers possibly including the at least one processor.

BACKGROUND OF THE INVENTION

Information processing systems often comprise multiple resource providers, predictable management of which can be crucial for safety-oriented applications. A resource is understood to be any measurable quantity that is provided by a resource provider. The resource may for example be one of the following: memory, processing time, data throughput, power, and device usage. The device usage may, for example, be usage of a processor, printer, scanner, detector or any other component or peripheral of an information processing system.

A share of a resource is usually allocated upon a request made by a component of the information processing device or by another device. For example, a processor of the information processing device may request a certain share of the memory of the information processing device, wherein the memory is distributed over a plurality of memory providers such as random-access memory chips and hard disks. Various methods are known by which one of a plurality of resource providers can be selected to provide the requested share of the resource.

A problem may occur in that after a request has been assigned to a resource provider, it may turn out that the application associated with the request may require additional amounts of the resource while the resource providers capacity is not sufficient for providing the additional amount of resource. In this case the application may be interrupted in an undesirable manner or fail altogether.

SUMMARY OF THE INVENTION

The present invention provides a data carrier and a device as described in the accompanying claims.

Specific embodiments of the invention are set forth in the dependent claims.

These and other aspects of the invention will be apparent from and elucidated with reference to the embodiments described hereinafter.

Further details, aspects and embodiments of the invention will be described, by way of example only, with reference to the drawings. Elements in the figures are illustrated for simplicity and clarity and have not necessarily been drawn to scale. Identical, similar or analogous components appearing in different figures are labeled using the same reference numerals and are not necessarily described more than once.

DETAILED DESCRIPTION OF THE PREFERRED EMBODIMENTS

Figure 1:
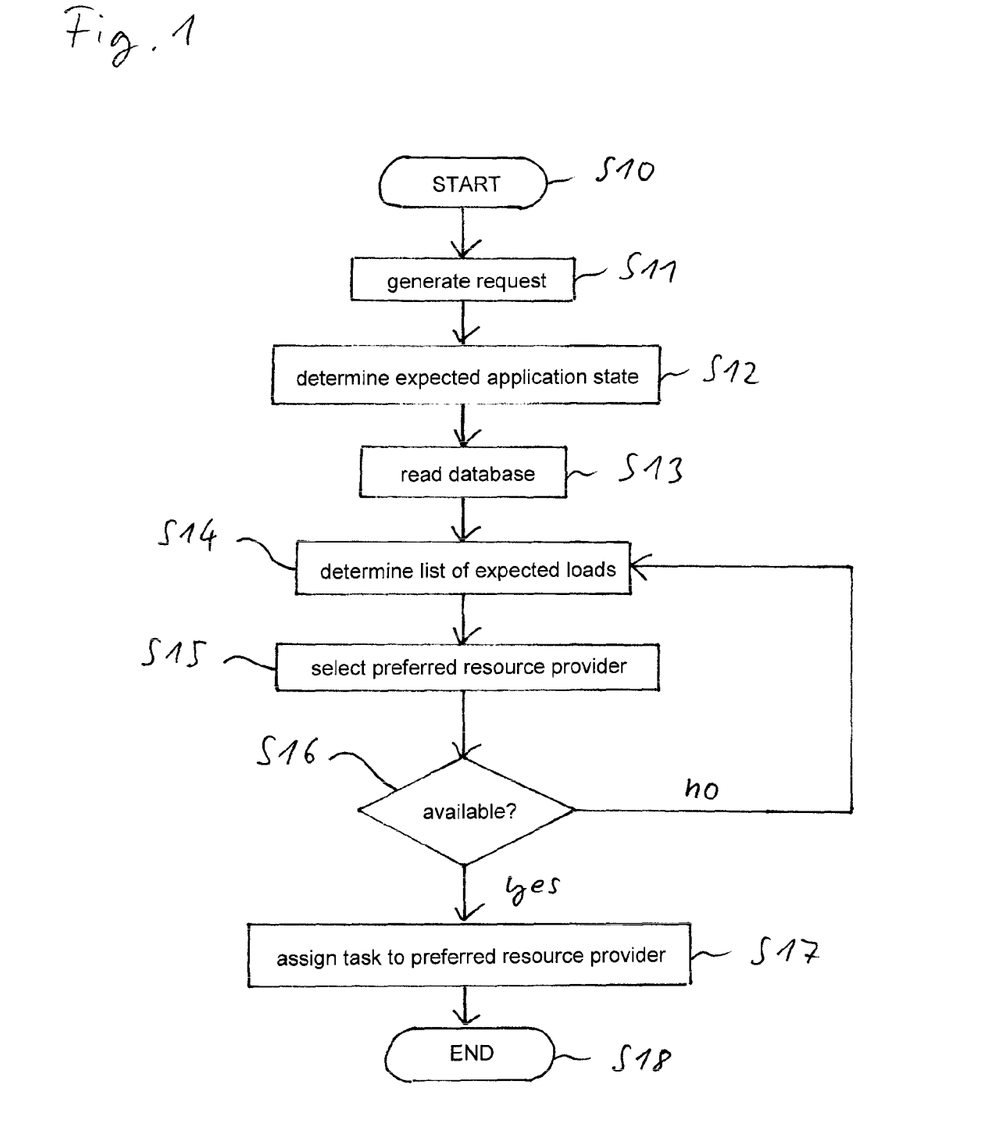
FIG. 1 shows a flow chart illustrating in a simplified manner an example of a method for selecting a resource provider from a given set of resource providers.

Schematically illustrated in FIG. 1 is an example of a method in which a particular resource provider is selected from a set of resource providers in order to provide a share of a resource in response to a request. Herein it is understood that the resource providers all provide the same type of resource, for example, memory (of dimension bits) or data throughput (of dimension bits per second). In a first step S11, a request for a share of the resource (resource request), for example, for a certain amount of memory or a certain data throughput, is generated by an application or in response to an application. The application may, for example, be a process running on a computer, or a mechanical process, such as the motion of a piston of an engine. In a subsequent step S12, an expected application state is determined on the basis of the request and possibly on the current state of the application. The expected application state may for example be inferred from a lookup table indicating a mapping between a set of request types and a set of possible transitions between application states. This may be facilitated by knowing the current state of the application. To this end, an entry indicating the current application state may be kept and updated each time the application undergoes a transition from one application state to another. The lookup table may comprise sub-tables, each sub-table containing the possible transitions for one specific application state, there being one sub-table for each application state. In a subsequent step S13 a database is read in order to determine an expected additional amount of the resource as a function of the expected application state. The additional amount of the resource is an amount of the resource which is expected to be required once the application has assumed its expected application state. For example, the requested amount of the resource and the additional amount of the resource may be, respectively, the memory required for loading a program and the amount of memory which is dynamically loaded during execution of the program. In a subsequent step S14 a list of expected total loads is determined, the list indicating for each of the resource providers an expected total load. The expected total load is determined on the basis of at least the following loads: the current load of the resource provider, the load corresponding to the additional amount of the resource, and the load corresponding to the requested amount of the resource. A load is understood to be the ratio of the amount of resource that is actually provided by a particular resource provider at a given instant and the maximum amount of resource that can be provided by the resource provider. In a subsequent step S15 a preferred resource provider is selected from the set of resource providers based on the list of expected total loads. The preferred resource provider may, for example, be the resource provider having the smallest expected total load. In step S16 it is determined whether the expected total load of the preferred resource provider is less than a predefined maximum load, the predefined maximum load being equal or less than 100%. If so, a task for which the resource request was made is assigned to the preferred resource provider, in the sense that the preferred resource provider is instructed to process the task. Otherwise the process returns to step 14, whereby the list of expected loads is determined at a later moment. The method ends in step S17.

Figure 2:
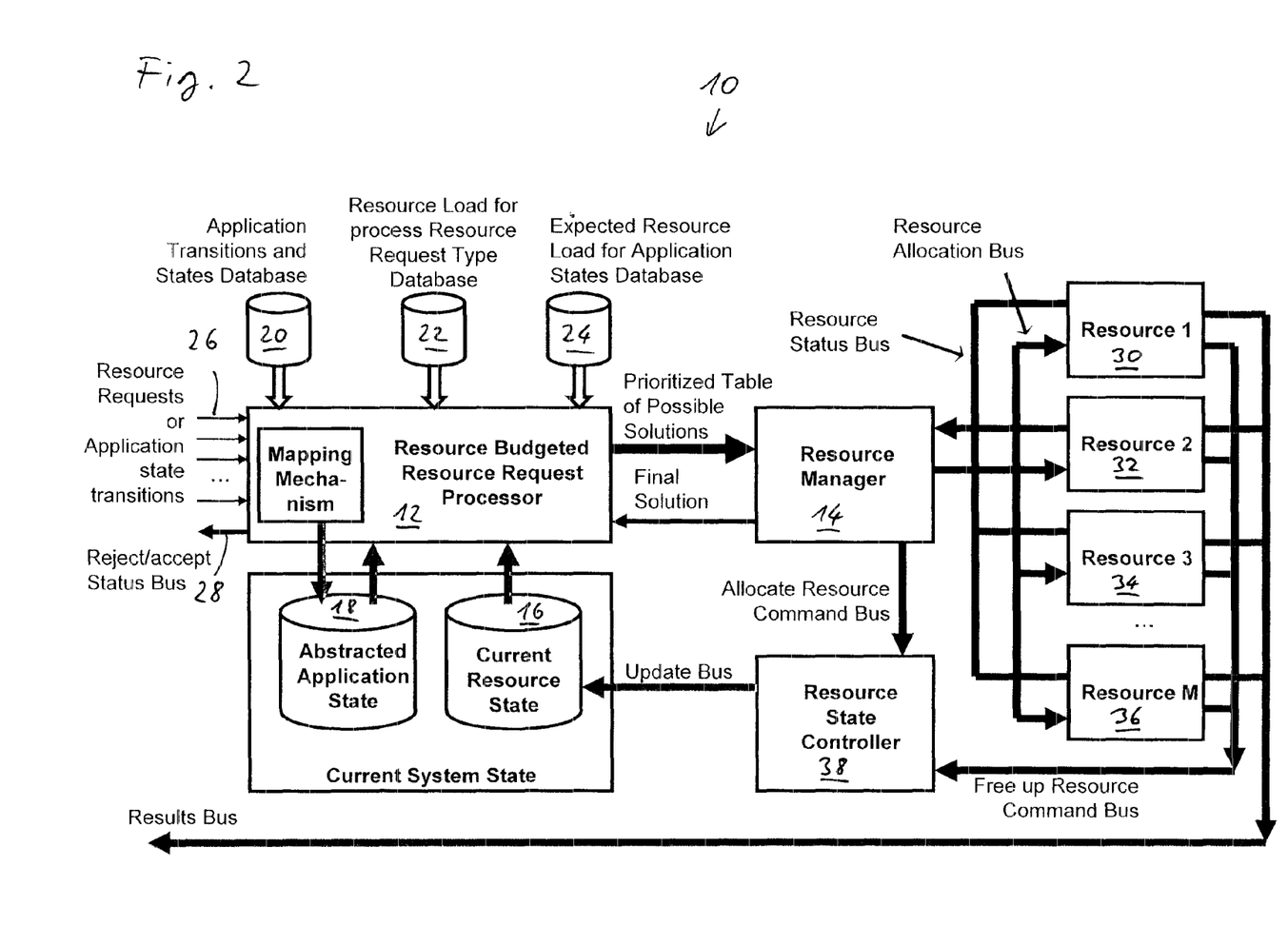
FIG. 2 schematically illustrates an example of a resource management system.

Referring now to FIG. 2, there is schematically illustrated a resource management system or device 10 intended to be used by or in conjunction with an application (not shown). The system 10 comprises a processor 12 and four resource providers 30, 32, 34, 36. The system 10 further comprises two dynamic databases 16, 18. The database 16 indicates the current individual loads of the resource providers 30, 32, 34, 36, while the database 18 indicates the current state of the application (current application state). The system 10 also comprises three static databases 20, 22, 24, namely, the "Application Transitions and States" database 20, the "Resource Load for processing Resource Request Type" database 22, and the "Expected Resource Load for Application States" database 24. The system 10 operates as follows. The processor 12 receives an incoming request 26 or an incoming identifier identifying an intended transition of an application state. Based on the request and using data stored in the "Application Transitions and States" database 20, the processor 12 determines an expected application state. Based on the expected application state, the processor 12 reads, for each of the resource providers 30, 32, 34, and 36, an expected load from the "Expected Resource Load for Application States" database 24, the expected load corresponding to the amount of resource likely to be required in the expected application state. The processor 12 further reads from the "Resource Load for processing Resource Request Type" database 22 for each of the resource providers 30, 32, 34, 36 a requested load corresponding to the received request 26. For each of the resource providers 30, 32, 34, 36, the processor sums the current load, the requested load, and the expected load, thereby generating a list of expected total loads (the "Prioritized Table of Possible Solutions"), the list indicating an expected total load for each of the resource providers 30, 32, 34, and 36. A resource manager 14 selects from the list the resource provider (30, 32, 34, or 36) having the smallest expected total load, that resource provider being referred to as the preferred resource provider. If its expected total load is less or equal 100%, the resource manager 14 allocates the corresponding amount of resource on the preferred resource provider. A "Resource State" controller 38 updates the data base 16 so as to indicate the new current loads of the resource providers. Similarly, once a task performed by one of the resource providers 30, 32, 34, 36 has been terminated, the corresponding load is deallocated on the resource provider, and the data base 16 is again updated.

Figure 3:
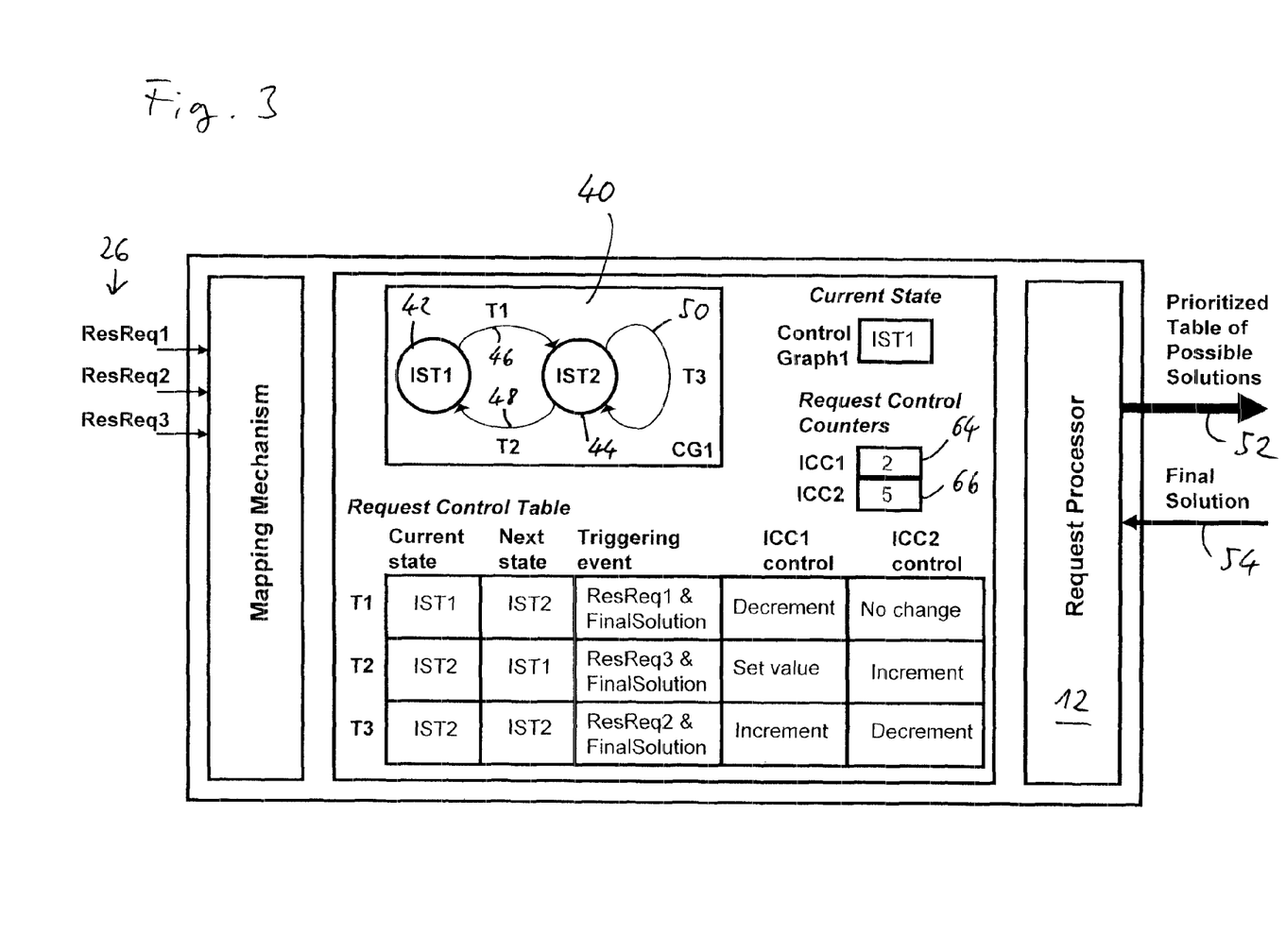
FIG. 3 schematically illustrates further features of the resource management system.

Referring now to FIG. 3, there is illustrated an operational mode of the resource management system 10 as described above, for a specific example in which the application is characterized by a flow control graph 40 having a first application state 42 (IST1) and a second application state 44 (IST2). The allowed transitions are a first transition 46 (T1) from the first state 42 to the second state 44, a second transition 48 (T2) from the second state 44 to the first state 42, and a third transition 50 (T3) from the second state 44 to the same state 44. The system 10 maintains a first counter value 64 and a second counter value 66 indicating the number of times a request corresponding to a transition to the first state 42 and to the second state 44, respectively, has been received but not granted. If one of the counter values has reached a maximum value, an error message is generated and further requests of the same type are rejected immediately. If on the other hand a request of the type has been granted, the respective counter value is decremented by one.

Figure 4:
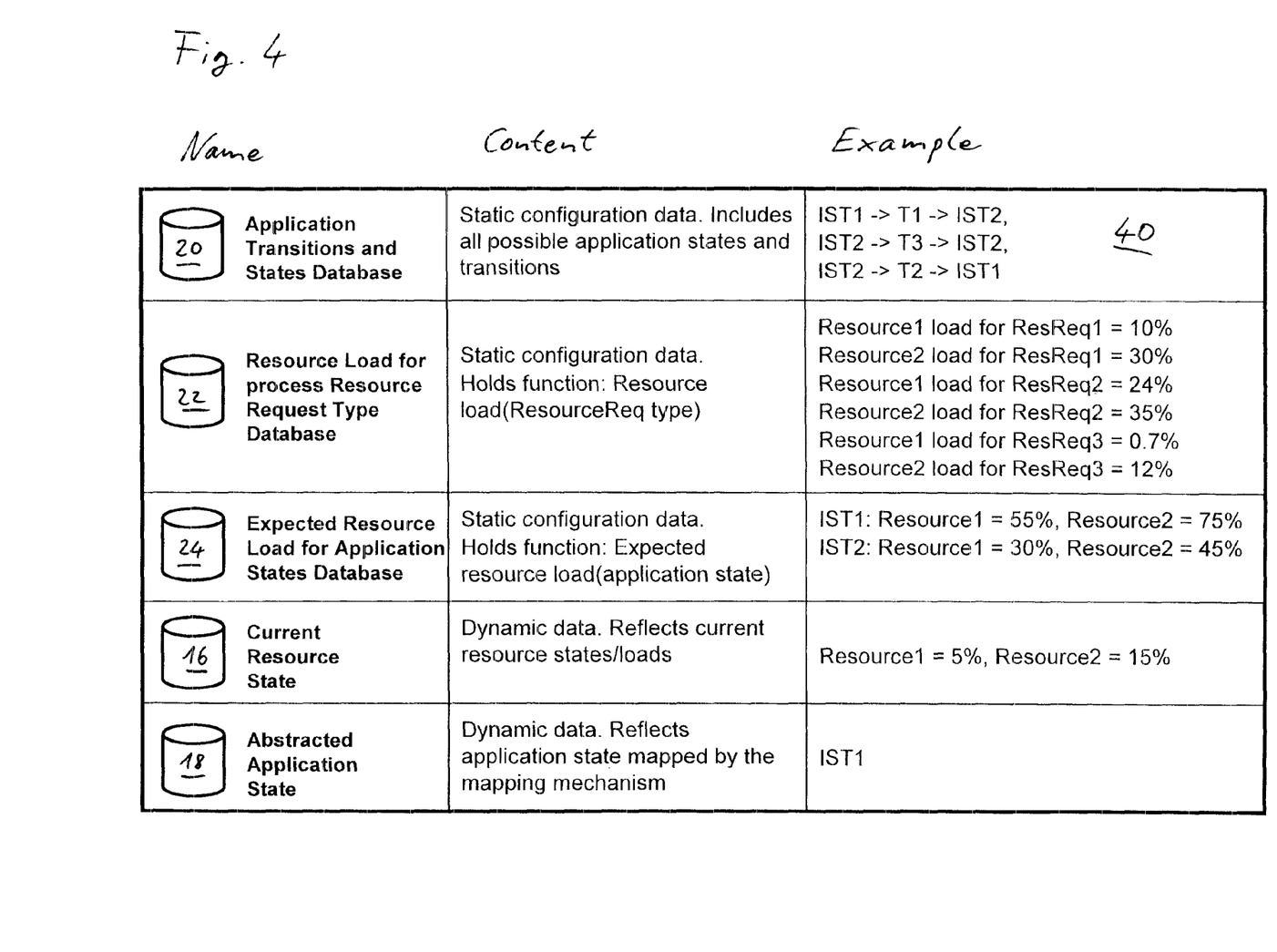
FIG. 4 provides an overview on various databases which may be part of the resource management system.

The static and dynamic databases mentioned above are listed in FIG. 4. The "Application Transitions and States" static database 20 contains data indicating all possible application states and transitions of the application. In the example given above with reference to FIG. 3, the database contains data equivalent to the flow control graph 40 comprising the two application states IST1 and IST2, and the three transitions T1, T2, T3. The "Resource Load for processing Resource Request Type" static database 22 contains data indicating for each of a variety of resource request types and for each of the resource providers 30, 32, 34, 36 a corresponding resource load. In the example given, a first, second, and third request type correspond to the first, second, and third transition, respectively. In the example, the load associated with the first request type is 10% for the first resource provider 30 and 30% for the second resource provider 32. Similarly, the load associated with the second request type is 24% for the first resource provider 30 and 35% for the second resource provider 32, while the load associated with the third request type is 0.7% for the first resource provider 30 and 12% for the second resource provider 32. The "Expected Resource Load for Application States" static database 24 contains data indicating for each of the application states of the application and for each of the resource providers 30, 32, 34, 36 an expected resource load. In the example given, the expected resource load for the application state IST1 is 55% for the first resource provider 30 and 75% for the second resource provider. For the second application state IST2 the expected resource load is 30% for the first resource provider 30 and 45% for the second resource provider 32. The "Current Resource State" dynamic database 16 contains data reflecting the current loads of the resource providers 30, 32, 34, 36. In the example given, the current loads of the first resource provider 30 and the second resource provider 32 are 5% and 15%, respectively. Finally, the "Abstracted Application State" dynamic database 18 contains data indicating the current application state as determined from resource requests received by the processor 12. In the present example, the current application state is the first application state IST1.

Figure 5:
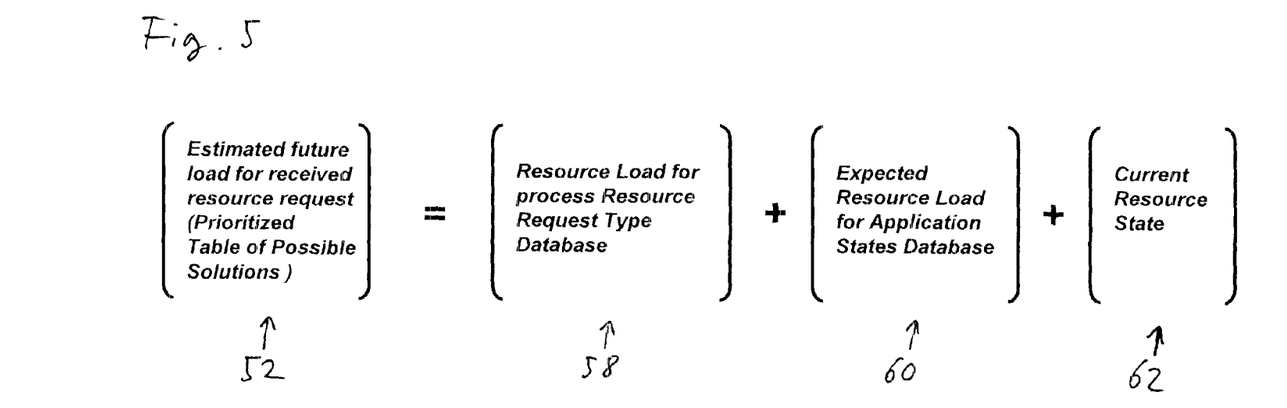
FIG. 5 schematically illustrates a step of determining a total expected load on a resource provider for a given request.

Represented in FIG. 5 is an example of the way in which the expected total loads are evaluated for each of the resource providers 30, 32, 34, 36. Each pair of brackets in the figure indicates a column vector, each line of which refers to one of the resource providers 30, 32, 34, 36. A "Current Resource State" vector 62 indicates the current loads of the resource providers. An "Expected Resource Load" vector 60 indicates the expected resource loads of the resource provider as determined from the "Expected Resource Load for Application States" database 24. A "Resource Request Load" vector 58 indicates the loads corresponding to the requested amount of the resource. The vectors 58, 60, and 62 are summed to yield an "Estimated Total Load" vector 52, each line of which corresponds to one of the resource providers 30, 32, 34, 36 and indicates the estimated total load for that resource provider. It is pointed out that the estimated total load is a hypothetical load, namely, it is the total load of the resource provider which would result if the requested amount of the resource were allocated on that resource provider. The estimated total load may well exceed 100%. In this case the requested amount of the resource cannot be allocated on the respective resource provider.

Figure 6:
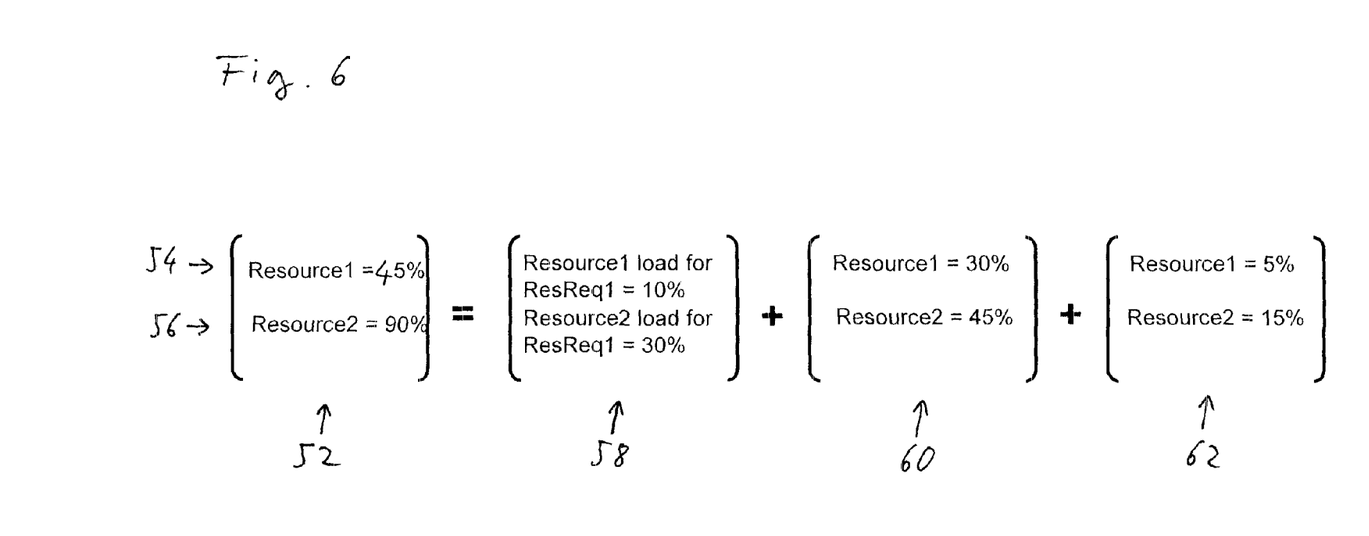
FIG. 6 schematically illustrates determining the total expected loads for two resource providers.

FIG. 6 illustrates, in an exemplary manner, possible values of the vectors 52, 58, 60, 62. The first line 54 and the second line 56 of the vector equation correspond to the first resource provider 30 and to the second resource provider 32, respectively. In the example, it is assumed that the application is in the first state IST1 and that a request for a transition from the first state IST1 to the second state IST2 has been received. In accordance with the exemplary values indicated in FIG. 4, the values of the vectors 58, 60, 62 are, respectively, 10%, 30%, and 5% in the first line 54 and 30%, 45%, and 15% in the second line 56. Accordingly, the expected total load for the first resource provider 30 is 10%+30%+5%=45%, while the expected total load for the second resource provider 32 is 30%+45%+15%=90%. Expected total loads for the third resource provider 36 and the fourth resource provider 38 are computed analogously (not shown). Again it is pointed out that the expected total loads are hypothetical in the sense that they indicate the load of a given resource provider that would occur if the corresponding request were assigned to that resource provider. After the expected total loads have been computed, a priority list is generated, the list indicating the resource providers 30, 32, 34, 36 in an order corresponding to their respective expected total load, the resource provider having the lowest expected total load (in the example, the first resource provider 30) being on top of the list. The resource manager 14 described above with reference to FIG. 1 subsequently allocates the requested amount of the resource on the resource provider on top of the list; if this fails for one reason or another, the resource manager 14 tries allocating the requested amount of the resource on the resource provider coming next in the priority list. More generally, the resource manager 14 tries to allocate the requested amount of the resource to one of the resource providers in an order prescribed by the priority list.

In summary, referring to FIGS. 1-6, a resource provider is selected as follows. A request 26 for an amount of a resource is received. The resource may be one of the following: memory, processing time, data throughput, power, and usage of a device. An expected state 44 of an application is determined on the basis of the request 26. A transition 46 in the control flow graph 40 of the application is also determined on the basis of the request 26. To this end, usage is made of data 20 indicating application states 42, 44 and/or possible transitions 46, 48, 50 between the application states. Usage is also made of data 24 indicating for each of the application states 42, 44 an additional amount of the resource. Usage is also made of data indicating for each of the application states 42, 44 and for each of the resource providers 30, 32, 34, 36 an additional load 60. Usage is also made of data 22 indicating for each of a variety of request types an amount of the resource, or indicating for each of a variety of request types and for each of the resource providers 30, 32, 34, 36 a load. For each resource provider in a set of resource providers 30, 32, 34, 36, a current load 62, a requested load 58 corresponding to the requested amount of the resource, and an additional load 60 corresponding to an expected state 44 of an application are determined. On the basis of the current load 62, the requested load 58, and the additional load 60, an expected total load 52 is determined for each of the resource providers 30, 32, 34, 36, for example, by computing for each of the resource providers 30, 32, 34, 36 the sum of the current load 62, the requested load 58, and the additional load 60. On the basis of the expected total loads 52, a preferred resource provider 30 is selected from the set of resource providers 30, 32, 34, 36. For example, the resource provider 30 having the smallest expected total load 52 may be selected as the preferred resource provider. Subsequently, an entry 16 indicating a current state 42 of the application is updated. The number of times a request of a specific type has been rejected may be counted. The application may or may not be executed by the device which selects the preferred resource provider. It is also noted that several applications may use the resource providers simultaneously.

Instructions for performing steps similar or identical to the steps described above may be stored on a data carrier (not shown).

The invention may also be implemented in a computer program for running on a computer system, at least including code portions for performing steps of a method according to the invention when run on a programmable apparatus, such as a computer system, or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received from elements of the device 10, for example, from computer readable media such as a memory of the device 10 or other media on other computer systems. Such computer readable media may be permanently, removably or remotely coupled to an information processing system such as the device 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the device 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A non-transitory data carrier carrying instructions for instructing a processor to:
   receive, from an application, a request for an amount of a resource;
   determine an expected state of the application on the basis of the request;
   identify a request control counter corresponding to the expected state of the application from a plurality of request control counters that corresponds to a plurality of application states, wherein a value of the identified request control counter represents the number of times requests that leads the application to transitioning to the expected state have been received but not granted;
   determine whether the value of the identified request control counter exceeds a maximum value;
   in response to determining the counter value has not exceeded the maximum value:
      determine for each resource provider in a set of resource providers a current load corresponding to a percentage of amount of resource currently utilized on the resource provider to the resource provider's total resource, a requested load corresponding to a percentage of the requested amount of the resource to the resource provider's total resource, and an additional load corresponding to a percentage of an additional amount of the resource to the resource provider's total resource, wherein the additional amount of the resource is expected to be required once the application has assumed the expected state;
      determine for each of the resource providers an expected total load based on a sum of the current load, the requested load, and the additional load;
      attempt to select from the set of resource providers, the resource provider with the smallest expected total load that is less or equal to 100% as a preferred resource provider;
      in response to not selecting a preferred resource provider, increment the value of the identified request control counter by 1; and in response to determining the counter value has exceeded the maximum value, reject the request for the amount of the resource.

2. The data carrier as set forth in claim 1, wherein the instructions for determining the expected state of the application comprise instructions for determining a transition in a control flow graph of the application on the basis of the request.

3. The data carrier as set forth in claim 1, carrying data indicating application states and/or possible transitions between the application states.

4. The data carrier as set forth in claim 3, carrying data indicating for each of the application states an additional amount of the resource.

5. The data carrier as set forth in claim 3, carrying data indicating for each of the application states and for each of the resource providers an additional load.

6. The data carrier as set forth in claim 1, carrying instructions for updating an entry indicating a current state of the application.

7. The data carrier as set forth in claim 1, carrying data indicating for each of a variety of request types for a resource an amount of the resource.

8. The data carrier as set forth in claim 1, carrying data indicating for each of a variety of request types and for each of the resource providers a load.

9. The data carrier as set forth in claim 1, wherein the instructions comprise instructions for computing for each of the resource providers the sum of the current load, the requested load, and the additional load.

10. The data carrier as set forth in claim 1, wherein the instructions comprise instructions for selecting as the preferred resource provider the resource provider having the smallest expected total load.

11. The data carrier as set forth in claim 1, carrying instructions instructing the processor to count the number of times a request of a specific type has been rejected.

12. The data carrier as set forth in claim 1, wherein the resource is one of the following: memory, processing time, data throughput, power, and usage of a device.

13. A method performed on at least one processor comprising:
running an application;
generating a request for an amount of a resource;
determining an expected state of the application on the basis of the request;
identifying a request control counter corresponding to the expected state of the application from a plurality of request control counters that corresponds to a plurality of application states, wherein a value of the identified request control counter represents the number of times requests that leads the application to transitioning to the expected state have been received but not granted;
determining whether the value of the identified request control counter exceeds a maximum value;
in response to determining the counter value has not exceeded the maximum value;
determining for each resource provider in a set of resource providers a current load corresponding to a percentage of amount of resource currently utilized on the resource provider to the resource provider's total resource, a requested load corresponding to a percentage of the requested amount of the resource to the resource provider's total resource, and an additional load corresponding to a percentage of an additional amount of the resource to the resource provider's total resource, wherein the additional amount of the resource which is expected to be required once the application has assumed the expected state;
determining for each of the resource providers an expected total load based on a sum of the current load, the requested load and the additional load;
attempting to select from the set of resource providers, the resource provider with the smallest expected total load that is less or equal to 100% as a preferred resource provider;
in response to not selecting a preferred resource provider, incrementing the value of the identified request control counter by 1; and
in response to determining the counter value has exceeded the maximum value, rejecting the request for the amount of the resource.

14. The method as set forth in claim 13, wherein the set of resource providers includes the at least one processor.

15. A device comprising at least one processor, a data carrier, and a set of resource providers, wherein:
the data carrier carries instructions for instructing the at least one processor to:
run an application;
generate resource requests, wherein each resource request is for an amount of a resource; and
for each resource request of the resource requests:
determine an expected state of the application on the basis of the resource request;
identify a request control counter corresponding to the expected state of the application from a plurality of request control counters that corresponds to a plurality of application states, wherein a value of the identified request control counter represents the number of times requests that leads the application to transitioning to the expected state have been received but not granted;
determine whether the value of the identified request control counter exceeds a maximum value;
in response to determining the counter value has not exceeded the maximum value;
determine for each resource provider of the set of resource providers a current load corresponding to a percentage of amount of resource currently utilized on the resource provider to the resource provider's total resource, a requested load corresponding to a percentage of the requested amount of the resource to the resource provider's total resource, and an additional load corresponding to a percentage of an additional amount of the resource to the resource provider's total resource, wherein the additional amount of the resource is expected to be required once the application has assumed the expected state;
determine for each of the resource providers an expected total load based on a sum of the current load, the requested load and the additional load; and
attempt to select from the set of resource providers, the resource provider with the smallest expected total load that is less or equal to 100% as a preferred resource provider;
in response to not selecting a preferred resource provider, increment the value of the identified request control counter by 1; and
in response to determining the counter value has exceeded the maximum value, reject the request for the amount of the resource.

16. The device as set forth in claim 15, wherein the data carrier comprises a memory.

17. The device as set forth in claim 15, carrying instructions instructing the processor to count the number of times a request of a specific type has been rejected.

18. The device as set forth in claim 15, wherein the instructions for determining the expected state of the application comprise instructions for determining a transition in a control flow graph of the application on the basis of the request.

19. The device as set forth in claim 15, wherein the data carrier is to carry data indicating application states and/or possible transitions between the application states.

20. The method set forth in claim 13, wherein the instructions comprise instructions instructing the processor to count the number of times a request of a specific type has been rejected.

* * * * *